United States Patent [19]
Goto et al.

[11] Patent Number: 5,497,388
[45] Date of Patent: Mar. 5, 1996

[54] LASER DIODE PUMPED SOLID LASER

[75] Inventors: Chiaki Goto; Hiroaki Hyuga, both of Kanagawa, Japan

[73] Assignee: Fuji Photo Film Co., Ltd., Kanagawa, Japan

[21] Appl. No.: 217,175

[22] Filed: Mar. 24, 1994

[30] Foreign Application Priority Data

Mar. 25, 1993 [JP] Japan ..................... 5-066510

[51] Int. Cl.$^6$ ..................................... H01S 3/10
[52] U.S. Cl. ..................... 372/22; 372/75; 372/27
[58] Field of Search ................ 372/2, 22, 27–98, 372/92, 75

[56] References Cited

U.S. PATENT DOCUMENTS

| | | | |
|---|---|---|---|
| 5,172,391 | 12/1992 | Zayhowski | 372/27 |
| 5,243,611 | 9/1993 | Hyuga et al. | 372/22 |
| 5,278,851 | 1/1994 | Goto | 372/22 |

FOREIGN PATENT DOCUMENTS

| | | | |
|---|---|---|---|
| 62-189783 | 8/1987 | Japan | H01S 3/109 |
| 4-318988 | 11/1992 | Japan | H01S 3/094 |

*Primary Examiner*—Leon Scott, Jr.
*Attorney, Agent, or Firm*—Sughrue, Mion, Zinn, Macpeak & Seas

[57] ABSTRACT

A solid laser medium is pumped by a semiconductor laser in order to produce a solid laser beam. The solid laser beam having thereby been obtained is caused to impinge upon a crystal of a nonlinear optical material, and the wavelength of the solid laser beam is thereby converted into a different wavelength. A nonlinear optical coefficient of the crystal of the nonlinear optical material utilized for the wavelength conversion is represented by $d_{IJ}$, where I, J=1, 2, 3, and an principal axis of indicatrix of the nonlinear optical material corresponding to J is represented by $\alpha$. The direction of linear polarization of a laser beam, which is produced by the semiconductor laser and serves as a pumping beam, is set in the direction, which coincides with the principal axis of indicatrix $\alpha$ when it is viewed from the direction of incidence of the pumping beam.

4 Claims, 3 Drawing Sheets

LASER DIODE PUMPED SOLID LASER

BACKGROUND OF THE INVENTION

1. Field of the Invention

This invention relates to a laser diode pumped solid laser, in which a solid laser medium is pumped by a semiconductor laser (or a laser diode). This invention particularly relates to a laser diode pumped solid laser, wherein a solid laser beam is caused to impinge upon a crystal of a nonlinear optical material, and the wavelength of the solid laser beam is thereby converted into a different wavelength, e.g., is shortened.

2. Description of the Prior Art

Laser diode pumped solid lasers have been proposed in, for example, Japanese Unexamined Patent Publication No. 62(1987)-189783. The proposed laser diode pumped solid lasers comprise a solid laser medium, to which a rare earth metal, such as neodymium (Nd), has been added. The solid laser medium is pumped by a semiconductor laser (a laser diode). In the laser diode pumped solid laser of this type, in order for a laser beam having as short a wavelength as possible to be obtained, a solid laser beam is passed through a crystal of a nonlinear optical material and is thereby converted into its second harmonic, or the like. Such a technique is described in, for example, Japanese Unexamined Patent Publication No. 4(1992)-318988.

With the conventional laser diode pumped solid lasers having the wavelength converting function, the intensity of the wavelength-converted wave cannot be kept sufficiently high. Therefore, a need exist for a laser diode pumped solid laser which is capable of yielding a wavelength-converted wave having a higher intensity than that obtained with the conventional laser diode pumped solid lasers.

SUMMARY OF THE INVENTION

The primary object of the present invention is to provide a laser diode pumped solid laser, which yields a wavelength-converted wave having a high intensity.

The present invention provides a laser diode pumped solid laser, in which a solid laser medium is pumped by a semiconductor laser in order to produce a solid laser beam, the solid laser beam having thereby been obtained is caused to impinge upon a crystal of a nonlinear optical material, and the wavelength of the solid laser beam is thereby converted into a different wavelength, wherein a nonlinear optical coefficient of the crystal of the nonlinear optical material utilized for the wavelength conversion is represented by $d_{IJ}$, where I, J=1, 2, 3, an principal axis of indicatrix of the nonlinear optical material corresponding to J is represented by α, and the direction of linear polarization of a laser beam, which is produced by the semiconductor laser and serves as a pumping beam, is set in the direction, which coincides with the principal axis of indicatrix α when it is viewed from the direction of incidence of the pumping beam.

The principal axis of indicatrix α of the nonlinear optical material corresponding to J will be described hereinbelow. FIGS. 5A and 5B are explanatory views showing the relationship between the orientation of a crystal of a nonlinear optical material and the direction of linear polarization of a pumping beam. As illustrated in FIG. 5A, a crystal of a nonlinear optical material 1 is considered. Also, it is assumed that the nonlinear optical coefficient $d_{33}$ of the nonlinear optical material is utilized for the wavelength conversion. As in the common practice in this field, the numerals for I and J correspond to X, Y and Z axes. Specifically, the numeral 1 represents the X axis, the numeral 2 represents the Y axis, and the numeral 3 represents the Z axis. The nonlinear optical coefficient $d_{IJ}$ represents a nonlinear optical coefficient such that a fundamental wave, which has been polarized linearly in the J direction, may be caused to impinge upon the crystal of the nonlinear optical material, and a wavelength-converted wave, which has been polarized linearly in the I direction, can be obtained from the crystal of the nonlinear optical material. For example, as illustrated in FIG. 5A, the nonlinear optical coefficient $d_{IJ}$ wherein I=J=3, i.e. the nonlinear optical coefficient $d_{33}$, represents a nonlinear optical coefficient such that a fundamental wave 2, which has been polarized linearly in the Z axis direction, may be caused to impinge upon the crystal of the nonlinear optical material 1, and a wavelength-converted wave 3, which has been polarized linearly in the Z axis direction, can be obtained from the crystal of the nonlinear optical material 1. (The direction of linear polarization of the fundamental wave 2 is indicated by the double headed arrow P. The direction of linear polarization of the wavelength-converted wave 3 is indicated by the double headed arrow Q.)

Specifically, in such cases, the principal axis of indicatrix α of the nonlinear optical material corresponding to J is the Z axis. Also, the direction, which coincides with the principal axis of indicatrix α when it is viewed from the direction of incidence of a pumping beam 5 impinging upon a solid laser medium 4, is the direction indicated by the double headed arrow R. With the laser diode pumped solid laser in accordance with the present invention, the direction of linear polarization of the pumping beam 5 is set in the direction indicated by the double headed arrow R.

As illustrated in FIG. 5B, two nonlinear optical coefficients may be utilized for the wavelength conversion. In this case, it is assumed that the nonlinear optical coefficients $d_{31}$ and $d_{32}$ are utilized. In this case, the fundamental wave 2 is caused to impinge upon the crystal of the nonlinear optical material 1 such that the direction of linear polarization of the fundamental wave 2, which direction is indicated by the double headed arrow P, may have the components in the X axis direction and the Y axis direction. The wavelength-converted wave 3, which has been polarized linearly in the Z axis direction, is obtained from the crystal of the nonlinear optical material 1.

Specifically, in this case, J=1 and 2. Therefore, the optic axes α of the nonlinear optical material corresponding to J are the X axis and the Y axis. Also, the direction, which coincides with the optic axes α when it is viewed from the direction of incidence of the pumping beam 5 impinging upon the solid laser medium 4, is the direction indicated by the double headed arrow R.

It has heretofore been considered that, in cases where the wavelength conversion is carried out with a laser diode pumped solid laser, the direction of linear polarization of the pumping beam will have no effect upon the intensity of the wavelength-converted wave. Therefore, there was no technical idea that the direction of linear polarization of the pumping beam should be set in a predetermined direction in order to enhance the intensity of the wavelength-converted wave.

However, research carried out by the inventors revealed that, if the direction of linear polarization of the pumping beam is set in the direction defined above in accordance with the present invention, the efficiency, with which the solid laser is stimulated, and the efficiency, with which the solid laser oscillates, can be enhanced and, as a result, the intensity of the wavelength-converted wave can be reliably kept high. By way of example, with the laser diode pumped solid laser in accordance with the present invention, the intensity of the wavelength-converted wave can be increased to approximately two times the intensity of the wavelength-converted wave obtained when the direction of linear polarization of the pumping beam is set in the most unfavorable direction.

DESCRIPTION OF THE PREFERRED EMBODIMENTS

The present invention will hereinbelow be described in further detail with reference to the accompanying drawings.

Figure 1:
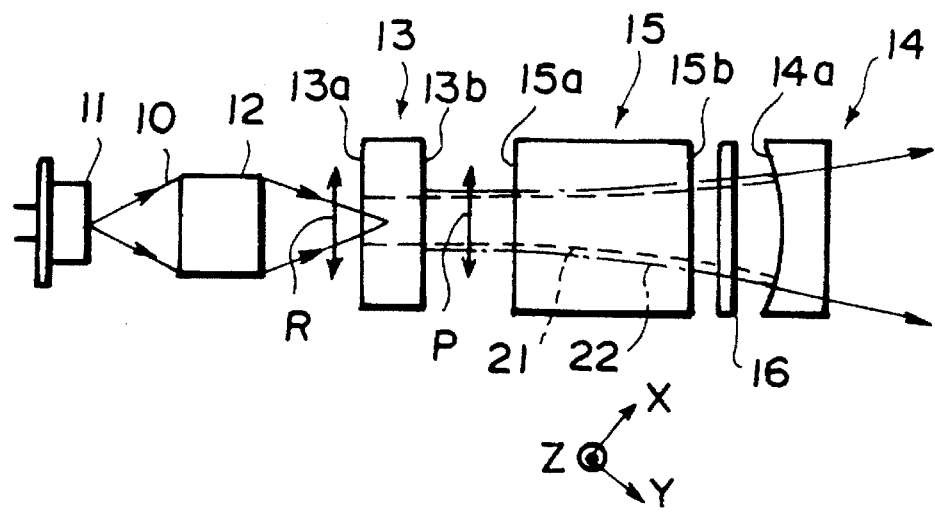
FIG. 1 is a schematic side view showing a first embodiment of the laser diode pumped solid laser in accordance with the present invention.

FIG. 1 is a schematic side view showing a first embodiment of the laser diode pumped solid laser in accordance with the present invention.

With reference to FIG. 1, the laser diode pumped solid laser is provided with a semiconductor laser 11, which produces a laser beam 10 serving as a pumping beam, and a condensing lens 12, which condenses the laser beam 10 having been produced as divergent light and which may be constituted of a rod lens, or the like. The laser diode pumped solid laser is also provided with a YAG crystal 13, which is a solid laser medium doped with neodymium (Nd). The YAG crystal 13 doped with neodymium (Nd) will hereinafter be referred to as the Nd:YAG crystal 13. The laser diode pumped solid laser is further provided with a resonator mirror 14, which is located on the side downstream (i.e. the right side in FIG. 1) from the Nd:YAG crystal 13. A crystal 15 of $KNbO_3$, which serves as a nonlinear optical material, and an etalon 16 are located between the Nd:YAG crystal 13 and the resonator mirror 14. (The crystal 15 of $KNbO_3$ will hereinbelow be referred to as the KN crystal 15. These elements are mounted together with one another on a single case (not shown). The temperatures of these elements are kept at a predetermined temperature by a temperature adjusting means (not shown).

The semiconductor laser 11 produces the laser beam 10 having a wavelength of $\lambda_1=808$ nm. The neodymium ions contained in the Nd:YAG crystal 13 are stimulated by the laser beam 10, and the Nd:YAG crystal 13 thereby produces a solid laser beam 21 having a wavelength of $\lambda_2=946$ nm. The solid laser beam 21 impinges upon the KN crystal 15 and is thereby converted into its second harmonic 22 having a wavelength of $\lambda_3=\lambda_2/2=473$ nm. The solid laser beam 21 is brought by the etalon 16 to the single longitudinal mode.

A rear end face 13a and a front end face 13b of the Nd:YAG crystal 13, a rear end face 15a and a front end face 15b of the KN crystal 15, and a concave mirror surface 14a of the resonator mirror 14 are provided with coatings, which have the characteristics shown below with respect to the wavelength of $\lambda_1=808$ nm, the wavelength of $\lambda_2=946$ nm, and the wavelength of $\lambda_3=473$ nm. AR represents no reflection (a transmittance of at least 99%), and HR represents high reflection (a reflectivity of at least 99.9%).

|  | 808 nm | 946 nm | 473 nm |
| --- | --- | --- | --- |
| End face 13a | AR | HR | — |
| End face 13b | — | AR | HR |
| End face 15a | — | AR | AR |
| End face 15b | — | AR | AR |
| Mirror surface 14 | — | HR | AR |

Because the coatings described above are provided, the laser beam 21 resonates between the end face 13a of the Nd:YAG crystal 13 and the mirror surface 14a. The laser beam 21 impinges in the resonating state upon the KN crystal 15. Therefore, the second harmonic 22 can be produced efficiently. The second harmonic 22 passes through the resonator mirror 14 directly or after being reflected from the end face 13b of the Nd:YAG crystal 13 towards the resonator mirror 14.

In this embodiment, the nonlinear optical coefficients $d_{31}$ and $d_{32}$ of the KN crystal 15 are utilized. For this purpose, the KN crystal 15 has been cut such that the light passage end faces 15a and 15b may make angles with respect to the X axis and the Y axis of the KN crystal 15. Also, the solid laser beam 21 is caused to impinge upon the KN crystal 15 such that the direction of linear polarization of the solid laser beam 21, which direction is indicated by the double headed arrow P, may have the components in the directions along the X axis and the Y axis of the KN crystal 15. In this manner, the second harmonic 22, which has been polarized linearly in the Z axis direction, is radiated out of the KN crystal 15.

In such cases, J is equal to 1 and 2 in the nonlinear optical coefficient $d_{IJ}$ of the KN crystal 15 utilized for the wavelength conversion. Therefore, the principal axis of indicatrix α of the KN crystal 15 corresponding to J are the X axis and the Y axis. Accordingly, the semiconductor laser 11 is located such that the direction of linear polarization of the laser beam 10, which is produced by the semiconductor laser 11 and serves as the pumping beam, (the direction of linear polarization being indicated by the double headed arrow R) may coincide with the X axis and the Y axis when it is viewed from the direction of incidence of the laser beam 10 upon the Nd:YAG crystal 13. With this embodiment wherein the direction of linear polarization of the laser beam 10 is set in this manner, the efficiency, with which the Nd:YAG crystal 13 is stimulated, and the efficiency, with which the solid laser beam 21 is produced, can be kept high. As a result, the second harmonic 22 having a high intensity can be obtained.

In experiments carried out in order to confirm the effects of the laser diode pumped solid laser in accordance with the present invention, the direction of linear polarization of the laser beam 10 was rotated 90° from the direction of linear polarization employed in the first embodiment and was thus set in the direction normal to the plane of the sheet of FIG.

1. In such cases, the intensity of the second harmonic 22 decreased to approximately one-half of the intensity of the second harmonic 22 obtained in the first embodiment.

Figure 2:
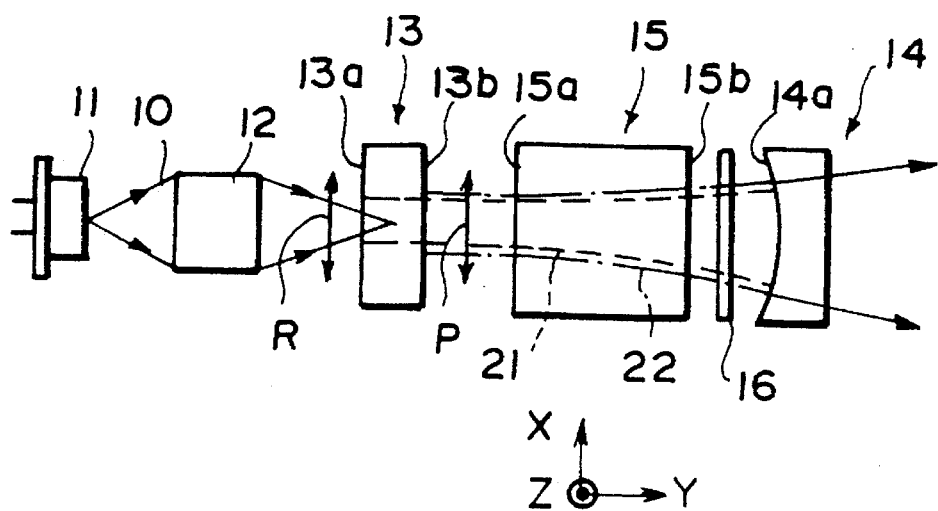
FIG. 2 is a schematic side view showing a second embodiment of the laser diode pumped solid laser in accordance with the present invention.

A second embodiment of the laser diode pumped solid laser in accordance with the present invention will be described hereinbelow with reference to FIG. 2. In FIG. 2 and those that follow, similar elements are numbered with the same reference numerals with respect to FIG. 1.

The second embodiment is basically equivalent to the first embodiment, except that a solid laser beam 21 having a wavelength of 1,064 nm is produced by the Nd:YAG crystal 13 and is converted into its second harmonic 22 having a wavelength of 532 nm and that only the nonlinear optical coefficient $d_{31}$ of the KN crystal 15 is utilized. Specifically, the KN crystal 15 has been cut such that the light passage end faces 15a and 15b may be parallel to the X axis and the Z axis of the KN crystal 15. Also, the solid laser beam 21 is caused to impinge upon the KN crystal 15 such that the direction of linear polarization of the solid laser beam 21, which direction is indicated by the double headed arrow P, may coincide with the X axis direction of the KN crystal 15. In this manner, the second harmonic 22, which has been polarized linearly in the Z axis direction, is radiated out of the KN crystal 15.

In such cases, J is equal to 1 in the nonlinear optical coefficient $d_{IJ}$ of the KN crystal 15 utilized for the wavelength conversion. Therefore, the principal axis of indicatrix α of the KN crystal 15 corresponding to J is the X axis. Accordingly, the semiconductor laser 11 is located such that the direction of linear polarization of the laser beam 10, which is produced by the semiconductor laser 11 and serves as the pumping beam, (the direction of linear polarization being indicated by the double headed arrow R) may coincide with the X axis when it is viewed from the direction of incidence of the laser beam 10 upon the Nd:YAG crystal 13. With this embodiment wherein the direction of linear polarization of the laser beam 10 is set in this manner, the efficiency, with which the Nd:YAG crystal 13 is stimulated, and the efficiency, with which the solid laser beam 21 is produced, can be kept high. As a result, the second harmonic 22 having a high intensity can be obtained.

Figure 3:
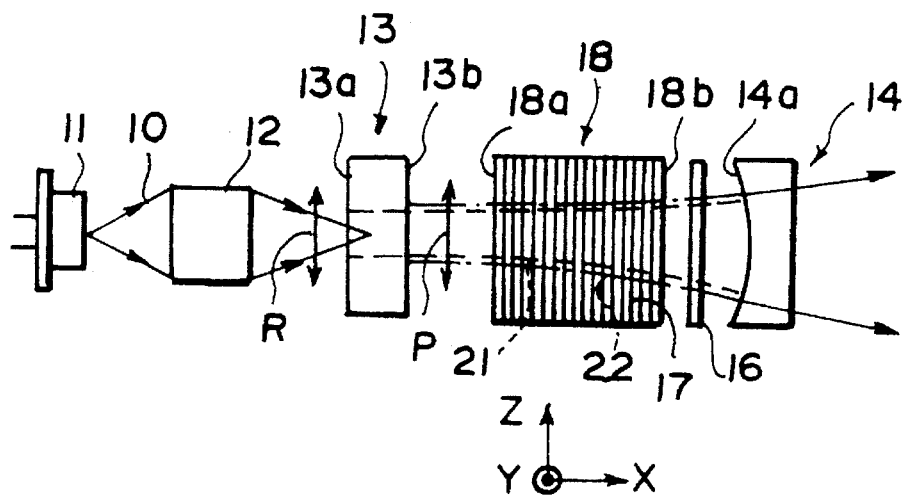
FIG. 3 is a schematic side view showing a third embodiment of the laser diode pumped solid laser in accordance with the present invention.

A third embodiment of the laser diode pumped solid laser in accordance with the present invention will be described hereinbelow with reference to FIG. 3. In the third embodiment, in lieu of the KN crystal 15 employed in the first embodiment, a crystal 18 of LiNbO$_3$, which is a ferroelectric substance and is provided with a periodic domain inversion structure 17, is employed as the wavelength converting element. The crystal 18 of LiNbO$_3$ will hereinbelow be referred to as the LN crystal 18. In this embodiment, the nonlinear optical coefficient $d_{33}$ of the LN crystal 18 is utilized. For this purpose, the LN crystal 18 has been cut such that its light passage end faces 18a and 18b may be parallel to the Y axis and the Z axis of the LN crystal 18. Also, the solid laser beam 21 is caused to impinge upon the LN crystal 18 such that the direction of linear polarization of the solid laser beam 21, which direction is indicated by the double headed arrow P, may coincide with the Z axis direction of the LN crystal 18. In this manner, the second harmonic 22, which has been polarized linearly in the Z axis direction, is radiated out of the LN crystal 18.

In such cases, J is equal to 3 in the nonlinear optical coefficient $d_{IJ}$ of the LN crystal 18 utilized for the wavelength conversion. Therefore, the principal axis of indicatrix α of the LN crystal 18 corresponding to J is the Z axis. Accordingly, the semiconductor laser 11 is located such that the direction of linear polarization of the laser beam 10, which is produced by the semiconductor laser 11 and serves as the pumping beam, (the direction of linear polarization being indicated by the double headed arrow R) may coincide with the Z axis when it is viewed from the direction of incidence of the laser beam 10 upon the Nd:YAG crystal 13. With this embodiment wherein the direction of linear polarization of the laser beam 10 is set in this manner, the efficiency, with which the Nd:YAG crystal 13 is stimulated, and the efficiency, with which the solid laser beam 21 is produced, can be kept high. As a result, the second harmonic 22 having a high intensity can be obtained.

In the periodic domain inversion structure 17, domain inversion regions, in which spontaneous polarization of the LN crystal 18 is inverted, are repeated periodically. With the periodic domain inversion structure 17, phase matching (the so-called "pseudo-phase matching") is effected between the solid laser beam 21, which serves as the fundamental wave, and its second harmonic 22. As the nonlinear optical material of the ferroelectric substance for constituting the periodic domain inversion structure 17, it is also possible to use, for example, LiTaO$_3$ (referred to as LT), MgO-LN, and MgO-LT.

Figure 4:
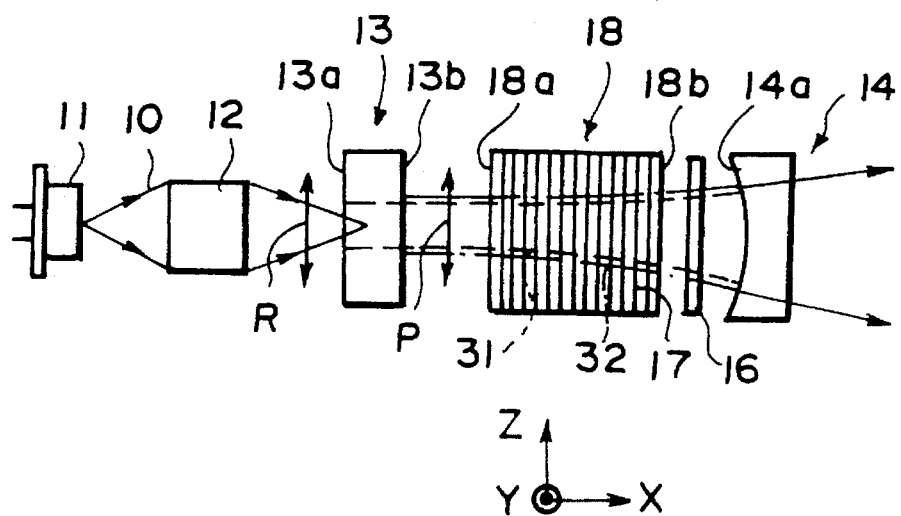
FIG. 4 is a schematic side view showing a fourth embodiment of the laser diode pumped solid laser in accordance with the present invention.
Figure 5A:
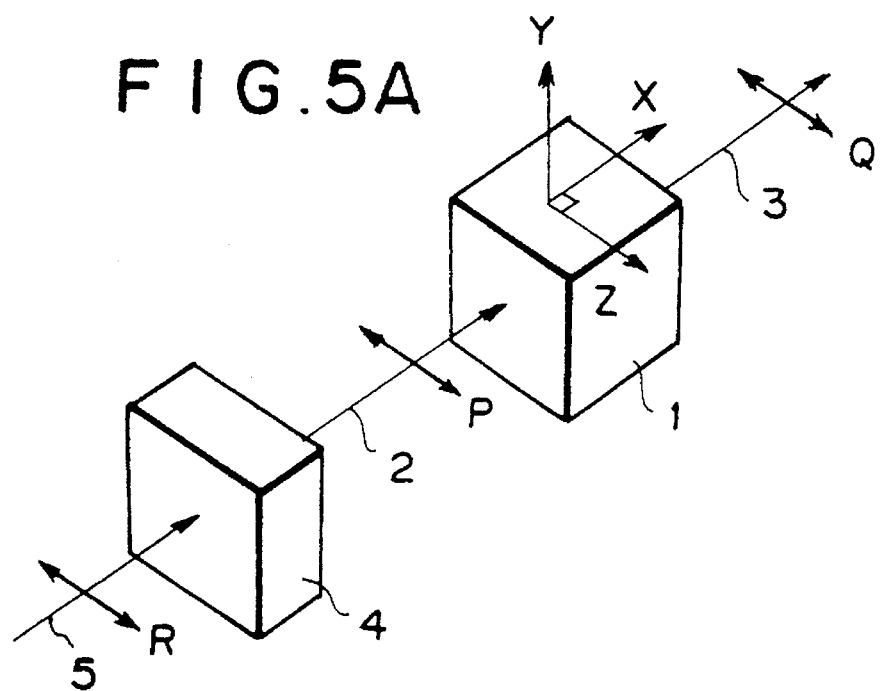
FIGS. 5A and 5B are explanatory views showing the relationship between the orientation of a crystal of a non-linear optical material and the direction of linear polarization of a pumping beam.
Figure 5B:
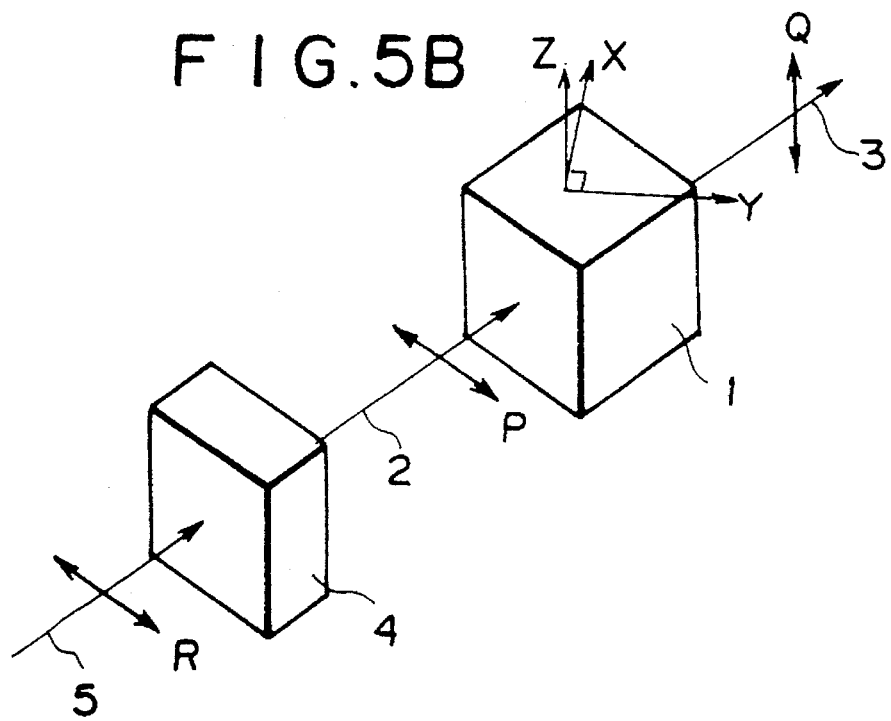

A fourth embodiment of the laser diode pumped solid laser in accordance with the present invention will be described hereinbelow with reference to FIG. 4. In this embodiment, the neodymium ions contained in the Nd:YAG crystal 13 are stimulated by the laser beam 10, which has a wavelength of $\lambda_1=808$ nm and is produced by the semiconductor laser 11. In this manner, the Nd:YAG crystal 13 produces a solid laser beam 31 having a wavelength of $\lambda_2=1,064$ nm. The solid laser beam 31 impinges upon the LN crystal 18, which is equivalent to the LN crystal 18 employed in the third embodiment described above. The solid laser beam 31 is thereby converted into its second harmonic 32 having a wavelength of $\lambda_3=\lambda_2/2=532$ nm.

In the fourth embodiment, as in the third embodiment, the nonlinear optical coefficient $d_{33}$ of the LN crystal 18 is utilized. Therefore, the manner in which the LN crystal 18 is cut, the relationship between the orientation of the LN crystal 18 and the direction of linear polarization of the solid laser beam 31, and the relationship between the orientation of the LN crystal 18 and the direction of linear polarization of the laser beam 10 serving as the pumping beam are equivalent to those in the third embodiment. In the fourth embodiment, the efficiency, with which the Nd:YAG crystal 13 is stimulated, and the efficiency, with which the solid laser beam 31 is produced, can be kept high. As a result, the second harmonic 32 having a high intensity can be obtained.

In the embodiments described above, the laser diode pumped solid laser converts the fundamental wave into its second harmonic. The laser diode pumped solid laser in accordance with the present invention is also applicable when fundamental waves are converted into a wave having a frequency equal to the difference between or the sum of the frequencies of the fundamental waves. Also, solid laser media, sources for pumping the solid laser media, and nonlinear optical materials, which are other than those described above, may also be employed.

What is claimed is:

1. A laser diode pumped solid laser for producing a wavelength-converted wave which is high in intensity, comprising:

a solid laser medium;

a semiconductor laser for producing a pumping beam which pumps said solid laser medium in order to produce a solid laser beam; and a crystal of a nonlinear optical material being impinged by said solid laser beam, thereby converting the wavelength of said solid laser beam into a different wavelength;

said crystal having a nonlinear optical coefficient $d_{IJ}$, where I and J=1, 2, 3 correspond to x, y, and z principal axes, respectively;

said nonlinear optical coefficient being represented by the formula $$\frac{x^2}{n_x^2} + \frac{y^2}{n_y^2} + \frac{z^2}{n_z^2} = 1,$$

wherein $n_x$, $n_y$, and $n_z$ represent principal refractive indices; and said pumping beam having a direction of linear polarization in a direction which coincides with a principal axis of an ellipsoid of wave normals when it is viewed from the direction of incidence of said pumping beam.

2. A laser diode pumped solid laser as defined in claim 1 wherein a rare earth metal has been added to the solid laser medium.

3. A laser diode pumped solid laser as defined in claim 2 wherein the rare earth metal is neodymium.

4. A laser diode pumped solid laser as defined in claim 1 wherein the solid laser beam, which has been produced by the solid laser medium, is converted into its second harmonic.

* * * * *